United States Patent
McGowan et al.

(10) Patent No.: US 8,521,742 B2
(45) Date of Patent: Aug. 27, 2013

(54) FOUR DIMENSIONAL SEARCH METHOD FOR OBJECTS IN A DATABASE

(75) Inventors: Albert John McGowan, Phoenix, AZ (US); Niko Thomas John Huffman, Chandler, AZ (US); Michael Edmund Godlewski, Mesa, AZ (US); Matthew A. Johnson, Tempe, AZ (US)

(73) Assignee: Unicorn Media, Inc., Tempe, AZ (US)

( * ) Notice: Subject to any disclaimer, the term of this patent is extended or adjusted under 35 U.S.C. 154(b) by 538 days.

(21) Appl. No.: 12/467,107

(22) Filed: May 15, 2009

(65) Prior Publication Data

US 2009/0287694 A1      Nov. 19, 2009

Related U.S. Application Data

(60) Provisional application No. 61/127,705, filed on May 15, 2008.

(51) Int. Cl.
*G06F 17/30*       (2006.01)
(52) U.S. Cl.
USPC ............................ 707/737; 707/706; 707/736
(58) Field of Classification Search
USPC ......................................... 707/706, 736, 737
See application file for complete search history.

(56) References Cited

U.S. PATENT DOCUMENTS

| | | | |
|---|---|---|---|
| 7,113,958 B1 * | 9/2006 | Lantrip et al. | 1/1 |
| 2003/0109951 A1 | 6/2003 | Hsiung et al. | |
| 2003/0195735 A1 * | 10/2003 | Rosedale et al. | 703/13 |
| 2004/0139105 A1 * | 7/2004 | Trepess et al. | 707/103 R |
| 2007/0239409 A1 | 10/2007 | Alan | |
| 2008/0052054 A1 | 2/2008 | Beverina et al. | |
| 2008/0177763 A1 * | 7/2008 | Lang | 707/100 |
| 2008/0183695 A1 | 7/2008 | Jadhav | |
| 2008/0189247 A1 | 8/2008 | Blinnikka et al. | |
| 2008/0208808 A1 | 8/2008 | Sue et al. | |

OTHER PUBLICATIONS

International Search Report and Written Opinion of PCT/US2009/044215 mailed Jul. 20, 2009, 9 pages.

\* cited by examiner

*Primary Examiner* — Mahesh Dwivedi
(74) *Attorney, Agent, or Firm* — Kilpatrick Townsend & Stockton LLP

(57) ABSTRACT

Embodiments of the disclosure provide a method and system used for searching among a plurality of entities on a computer network by a user. A computer server in communication with the computer network can include a database with a storage mechanism, a rule set, and an interaction calculation engine. The user can search for a first entity using a location calculation engine in communication with the computer network. The location calculation engine can locate the first entity and determine and display at least a second portion of the plurality of entities relevant to the first entity.

20 Claims, 6 Drawing Sheets

FIGURE 6

| Entity 1 | Entity 2 | Weight |
|---|---|---|
| Tarantino | Pulp Fiction | 5 |
| Tarantino | Reservoir Dogs | 5 |
| Tarantino | From Dusk Till Dawn | 5 |
| Tarantino | Kill Bill Vol 1 | 5 |
| Tarantino | Kill Bill Vol 2 | 5 |

FIGURE 7

| Entity 1 | Entity 2 | Weight |
|---|---|---|
| Tarantino | Pulp Fiction | 6 |
| Tarantino | Reservoir Dogs | 5 |
| Tarantino | From Dusk Till Dawn | 5 |
| Tarantino | Kill Bill Vol 1 | 5 |
| Tarantino | Kill Bill Vol 2 | 5 |
| Scott | Tarantino | 3 |
| Scott | Pulp Fiction | 7 |

FIGURE 8

| Entity 1 | Entity 2 | Weight |
|---|---|---|
| Tarantino | Pulp Fiction | 6 |
| Tarantino | Reservoir Dogs | 5 |
| Tarantino | From Dusk Till Dawn | 5 |
| Tarantino | Kill Bill Vol 1 | 5 |
| Tarantino | Kill Bill Vol 2 | 5 |
| Scott | Tarantino | 3 |
| Scott | Pulp Fiction | 7 |
| Reservoir Dogs | From Dusk Till Dawn | 6 |
| Bill | Reservoir Dogs | 4 |
| Bill | From Dusk Till Dawn | 7 |

FOUR DIMENSIONAL SEARCH METHOD FOR OBJECTS IN A DATABASE

RELATED APPLICATION

This application claims priority to Provisional Application No. 61/127,705, filed May 15, 2008 (titled FOUR DIMENSIONAL SEARCH METHOD USING QUANTUM MECHANICS TO SUPPLY/ASSIGN GRAVITY TO OBJECTS IN A DATABASE AND FORM RELATIONSHIPS BETWEEN THOSE OBJECTS by Albert McGowan, et al.). the contents of which are incorporated herein by reference in their entirety.

BACKGROUND

Conventional methods for calculating and determining relevancy between entities involves defining a relationship between each set of two (or more) entities and assigning a "weight" to the relationship. In such methods, each relationship is explicitly defined and weight assigned based on any number of factors.

In some early internet search engines, relationships between search terms and web sites were defined and weight was arbitrarily assigned to those relationships manually. More modern internet search engines use a similar paradigm, but "crawl" websites to gather information and use complex algorithms to programmatically define relationships and assign weights to them. However, even with modern programmatic means of defining relationships and assigning weight, this type of method still requires that each individual relationship and weight still be explicitly stored. In addition, each relationship may have to be maintained twice as the relative weight of a first entity to a second entity may not necessarily be the same as the relative weight of the second entity to the first entity.

While the type of method used by modern internet search engines makes direct relationships easy to define and identify, it has two significant drawbacks. First, in order for it to be effective, each and every relationship must be individually maintained. Thus, it requires a massive amount of data storage and processing power. This is particularly evident as new entities are introduced into the model because on introduction, all applicable relationships must be defined. Second, as the volume of entities grows, the number of relationships grow exponentially and one must either store each relationship explicitly or search an exponential number of relationships. Therefore, complex or inferred relationships are difficult to identify with this method.

SUMMARY OF THE DESCRIPTION

Some embodiments of the disclosure provide a method and system used for searching among a plurality of entities on a computer network by a user. The method and system can include a computer server in communication with the computer network. The computer server can include a database with a storage mechanism that stores the plurality of entities and attributes specific to each of the plurality of entities, a rule set that defines how interactions between the plurality of entities in the relevancy universe are quantified using Newtonian physics and the plurality of entities' attributes, and an interaction calculation engine that uses the rule set to interpret and apply interactions between at least a first portion of the plurality of entities. The interactions can cause a transformation of at least the first portion of the plurality of entities' attributes.

The method and system can also include a location calculation engine in communication with the computer network and the user can search for a first entity using the location calculation engine. The location calculation engine can use the computer server to locate the first entity in the storage mechanism and determine at least a second portion of the plurality of entities relevant to the first entity based on the first entity's current attributes and the plurality of entities' current attributes. At least the second portion of the plurality of entities can be displayed to the user on the computer network.

Further embodiments of the disclosure provide a method for finding relationships between physical objects represented on a computer network. The method comprises gathering data about the physical objects from the computer network and representing the physical objects as entities in a relevancy universe. The method further comprises assigning physical attributes to the entities based on the data gathered from the network and creating interactions between the entities, where the interactions constantly modify the physical attributes of the entities based on Newtonian physics principals and further data about the physical objects gathered on the computer network. The method also comprises recognizing relationships between entities in close proximity to each other in the relevancy universe and associating the relationships between entities as relationships between the physical objects.

BRIEF DESCRIPTION OF THE DRAWINGS

FIG. 6 is an initial state of relationships between objects and events in accordance with conventional search methods.
FIG. 7 is another state of the relationships of FIG. 6.
FIG. 8 is another state of the relationships of FIG. 6.

DETAILED DESCRIPTION

Figure 1:
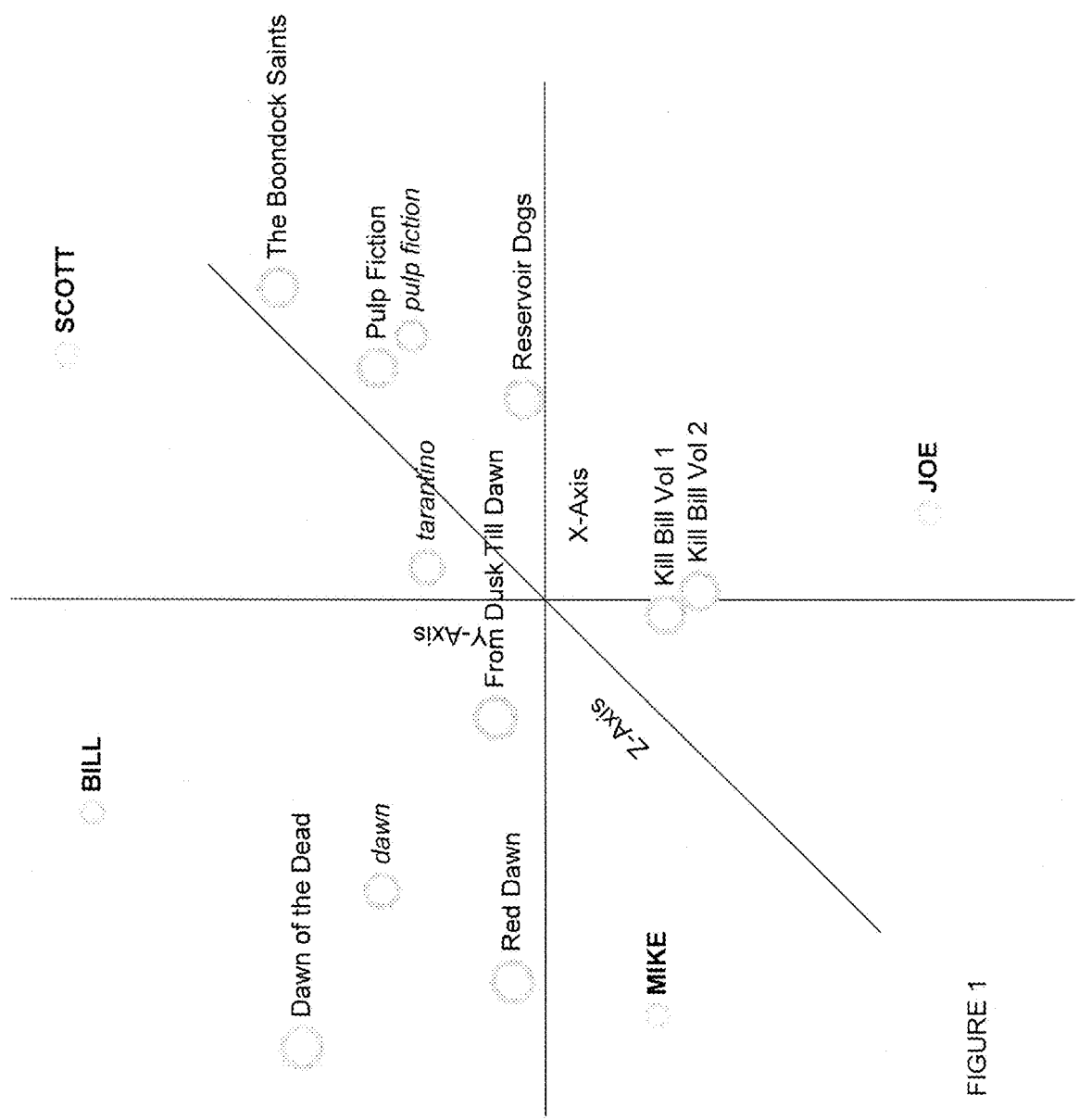
FIG. 1 is an initial state of a relevancy universe used in accordance with some embodiments of the disclosure.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings. connections, supports, and couplings. Further, "connected" and "coupled" are not restricted to physical or mechanical connections or couplings.

The following discussion is presented to enable a person skilled in the art to make and use embodiments of the disclosure. Various modifications to the illustrated embodiments will be readily apparent to those skilled in the art, and the generic principles herein can be applied to other embodiments and applications without departing from embodiments of the disclosure. Thus, embodiments of the disclosure are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the disclosure. Skilled artisans will recognize the examples provided herein have many useful alternatives and fall within the scope of embodiments of the disclosure.

Some embodiments of the disclosure calculate the relevancy of entities by representing each entity in a theoretical three-dimensional space. The distance between the entities can be considered the relevancy between them. Interactions between entities (e.g., events involving those entities) can mimic gravitational events in the three-dimensional space. Using Newtonian physics, the gravitational events can be calculated to affect each entity's location, mass, and vector.

The theoretical three-dimensional space can be limited or unlimited, and can be referred to as a "relevancy universe" or "universe". The relevancy universe can be represented using three-dimensional Cartesian (x,y,z) coordinates. The coordinates can indicate relative distance from a center point of the relevancy universe, where the center point is the origin ("zero point") of intersecting x-, y-, and z-axes. Individual entities can be represented in the relevancy universe by a location (P) of the entity, a vector (r) of the entity, a mass (m) of the entity, and a time (t) at which the entity was observed (at the location P, with the mass m and the vector r). The location (P) of the entity can be described as Cartesian (x,y,z) coordinates relative to each axis. The vector (r) of the entity can be described using unit vectors (xi,yk,zl) indicating velocity in the direction of each axis (i.e., i indicating the velocity relative to the x axis, k indicating velocity relative to the y axis, and I indicating velocity relative to the z axis). The mass (m) of the entity can be described using a floating-point number. The time (t) at which the entity was observed can be described using POSIX time, i.e., an integer representation of the number of seconds since 00:00:00 UTC (coordinated universal time) on Jan. 1, 1970.

Interactions between two (or more) entities can be represented as gravity, such that these entities can become attracted to each other momentarily. These interactions can be referred to as "gravitational events". A defined rule set can correlate events and interactions involving the actual entities with corresponding gravitational events in the relevancy universe. Any entity can be represented within the relevancy universe, so long as interactions between the actual entity and other entities represented in the relevancy universe can be identified, quantified based on the defined rule set, and represented as gravitational events within the relevancy universe. The result of a gravitational event can affect the velocity of the entity, and thus, the vector (r) of the entity, as well as the location (P) of the entity at an observed time (t).

In some embodiments of the disclosure, the relevancy of a first entity (A) to a second entity (B) can be determined by the distance between the entities in the relevancy universe. The relevancy of a single entity (C) to a group of entities (DEF) can be determined either by the distance between the single entity and each entity in the group (CD, CE, CF) or by the distance between the single entity (C) and the epicenter of the group (DEF).

An element of friction can exist in the relevancy universe, such that over time, an entity which has velocity, but is not acted on by a gravitational event, will lose velocity. Also, an element of entropy can exist in the relevancy universe, such that over time, disorder will be introduced, and an entity which has lost all velocity and has not been acted on by a gravitational event, will naturally gain velocity. Similarly, entities which have, by the nature of their interactions, achieved close proximity, can begin separating by virtue of entropy.

An element of universal gravity can exist in the relevancy universe, such that (as in the actual universe) some measure of gravitational interaction exists between all entities in the relevancy universe. Therefore, gravitational events in the relevancy universe can follow generally-accepted laws of modern physics and generally-accepted formulae can be used to determine the effect of gravity and friction on individual entities (e.g., Newtonian physics principals). The Universal Gravitational Constant can be altered from a generally-accepted value to utilize masses and velocities of less-than planetary proportions. As entities interact within the relevancy universe, they can gain or lose mass, again based on the defined rule set.

To apply the above-mentioned method, some embodiments of this disclosure provide a storage/retrieval mechanism, a recording mechanism, a rule set, an interaction calculation engine, and a location calculation engine. The storage/retrieval mechanism can represent entities within the relevancy universe. The storage/retrieval mechanism can be constructed using a database engine and can be represented as a database table with at least some of the following attributes: a unique identifier (ID), distance from the zero point on the x-axis (Px), distance from the zero point on the y-axis (Py), distance from the zero point on the z-axis (Pz), velocity in the direction of the x-axis (Vx), velocity in the direction of the y-axis (Vy), velocity in the direction of the z-axis (Vz), mass (M), time (T), and additional attributes of the entity which might be of interest to a particular application of the disclosure.

In some embodiments, the recording mechanism can record interactions between entities. The recording mechanism can be implemented as a software process on a special-purpose computer, via computer-readable media, or by a digital or analog hardware device to generate a representation of interactions between actual entities. The recording mechanism can include an input mechanism, a storage mechanism, and a relay mechanism. The input mechanism, the storage mechanism, and the relay mechanism can be separate mechanisms or two or more can be incorporated to form a single mechanism. Examples of input mechanism types can include, but are not limited to, manually generated (e.g., typed into a software application), programmatically collected (e.g., generated from "data mining" software, "business intelligence" software, "web crawler" software, or other programmatic means), or collected using hardware, firmware, or biometric inputs. Examples of storage and relay mechanisms include, but are not limited to, a binary file, a comma-delimited or tab-delimited file, or a database engine. Interactions between entities can include one or more of the following attributes: a list of entities involved in the interaction, a type of interaction, and additional attributes of the entity which might be of interest to the particular application of the disclosure.

In some embodiments, the rule set can define how interactions between entities are quantified and represented in the relevancy universe. This can be a logical rule set. In addition, the rule set can be implemented directly into one of the calculation engines, via computer readable media or by alternate means, such as a configuration file or a database table. Further, the rule set can be implemented as a software process on a special-purpose computer. Rules in the rule set can include at least a type of interaction and an effect on entities involved in the interaction.

In some embodiments, the interaction calculation engine can interpret interactions between entities and calculate the effect of those interactions on the involved entities. The calculation engine be executed via computer readable media, or implemented as a software process on a special-purpose computer, and can perform at least some of the following tasks: interpret an interaction, determine the rule sets which apply to the interaction, determine the change in state which should be applied to the entities involved in the interaction as a result, and apply the necessary change in state to the affected entities.

In some embodiments, the location calculation engine can locate a particular entity within the relevancy universe as well as other entities relevant to the particular entity. The location calculation engine can also be executed via computer readable media, or implemented as a software process on a special-purpose computer, and can perform at least some of the following tasks: identify and locate an entity by its unique identifier, identify and locate an entity by other attributes, locate those entities most relevant to a single entity, and locate those entities most relevant to a group of entities. In some embodiments, the location calculation engine can act like a search engine website and can receive user input (e.g., a search query) and display relevant entities (e.g., search results).

In some embodiments, one or more of the mechanisms and/or engines described above can be stored and/or executed on one or more computer servers, or on special-purpose computers or digital or analog hardware devices connected to one or more servers. The mechanisms, engines, and computer servers can be in communication over a computer network.

Below is an example sequence of four events illustrating how objects and events can be represented in a relevancy universe in accordance with some embodiments of the disclosure. The example is in the context of a website on which users search for, preview, and purchase films. The website can be on a network (e.g., the internet) which is in communication with a computer server. A rule set defined for the universe can be stored in a database on the computer server and can include the following: if a user searches for a keyword and selects an item from the search results a gravitational event occurs between entities representing the user, the keyword, and the selected result; if a user searches for a keyword and does not select an item from the search results, a negative gravitational event occurs between entities representing the keyword and the results returned from the search; if a user purchases a film, a gravitational event occurs between entities representing the user and the film; and users have less mass than keywords, which have less mass than films, such that if a user searches for a keyword and selects a film from the resulting list, the gravitational event will have more effect on the user than on the keyword, and more effect on the keyword than on the film. The initial state of the relevancy universe is shown in FIG. 1. Note that in the following figures (FIGS. 1-5), entities representing users of the website are shown in capital letters and bold font, entities representing search keywords are shown in lowercase letters and italic font, and entities representing movie titles are shown in normal font.

Figure 2:
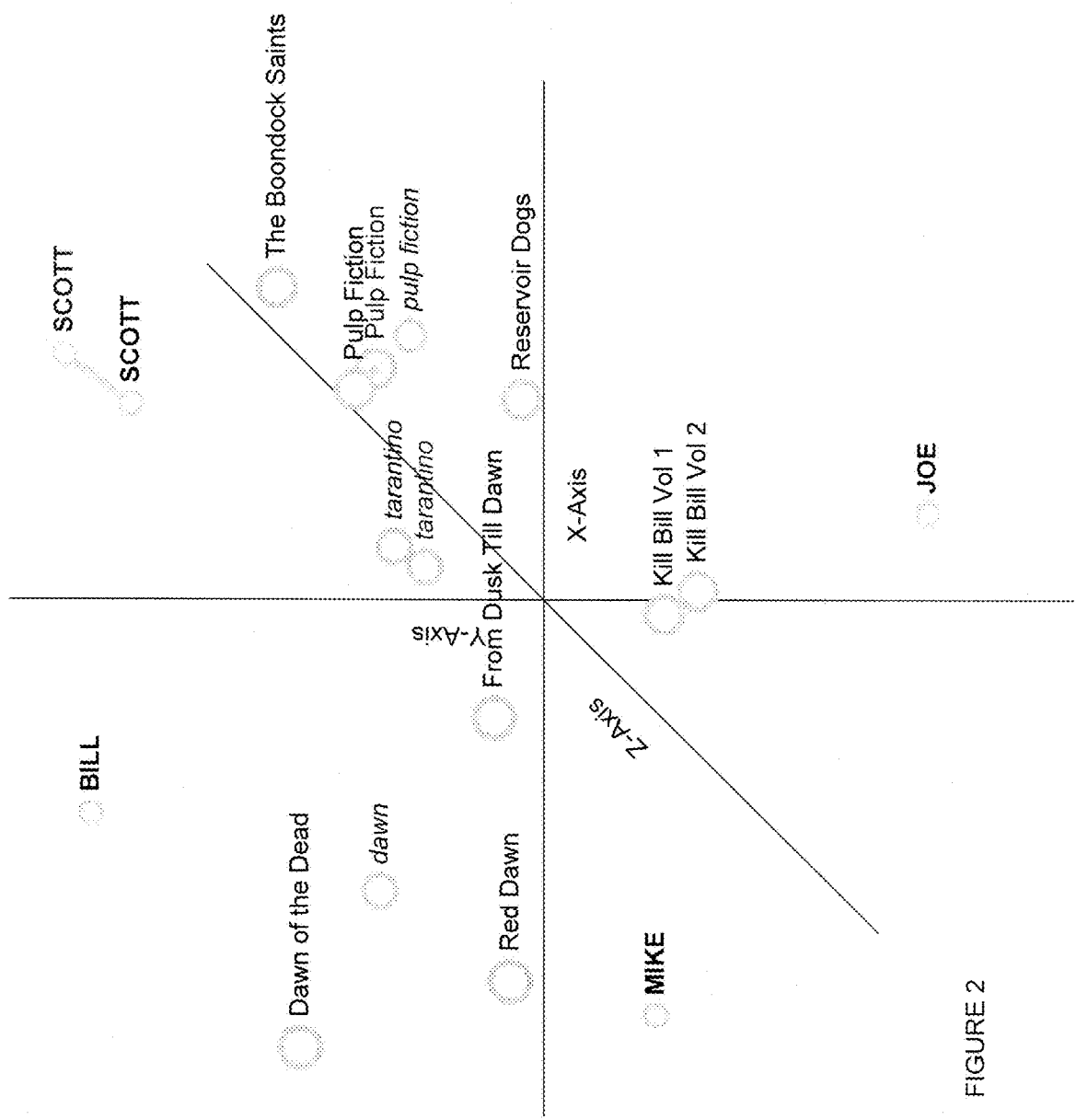
FIG. 2 is another state of the relevancy universe of FIG. 1.

Event 1: Scott is interested in films directed by Quentin Tarantino, and executes a search with the keyword "tarantino" on the website. A simple text search returns results which include "Reservoir Dogs", "From Dusk Till Dawn", "Pulp Fiction", "Kill Bill Vol. 1", "Kill Bill Vol. 2," via the location calculation engine. From the search results, Scott selects "Pulp Fiction". As a result, a gravitational event occurs between Scott, the keyword "tarantino", and the film "Pulp Fiction" via the interaction calculation engine based on the rule set defined above, and the two entities are pulled closer together in the universe via an interaction calculation engine. The gravitational event and new locations and/or other attributes of the entities representing their current state in the universe can be recorded via a recording mechanism on the computer server. FIG. 2 illustrates the end state of the universe after this event. Note that past and present locations are shown for entities that have moved during this event (see Scott's locations, for example). The past entities are a shade lighter than the present entities and the past and the present entities are connected by a shaded line. The end state of the universe then becomes the new initial state of the universe. This new state of the universe can be recorded via the storage/retrieval mechanism and saved in a database on the computer server.

Figure 3:
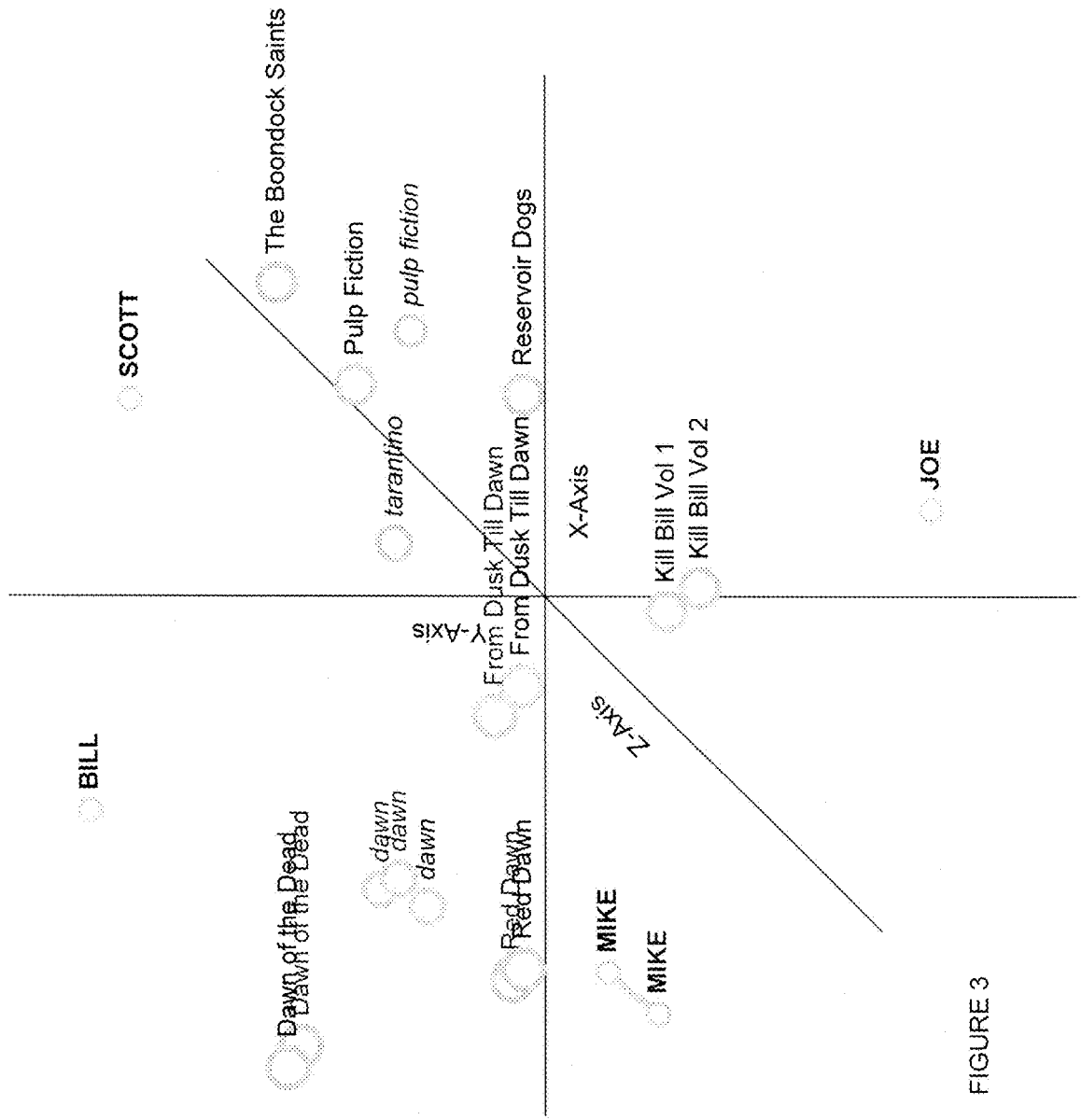
FIG. 3 is another state of the relevancy universe of FIG. 1.

Event 2: Mike is looking for a film named "Red Dawn" and executes a search with the keyword "dawn". A simple text search returns results which include "Dawn of the Dead" and "From Dusk Till Dawn", but not "Red Dawn". Mike selects the second page of search results. As a result, a negative gravitational event occurs between the keyword "dawn", and the films "Dawn of the Dead" and "From Dusk Till Dawn", thus pushing them further away from each other in the universe. Mike finds the film "Red Dawn" on the second page of search results, and selects the film. As a result, a gravitational event occurs between Mike, the keyword "dawn", and the film "Red Dawn". FIG. 3 illustrates the end state of the universe after this event. The end state of the universe then becomes the new initial state of the universe.

Figure 4:
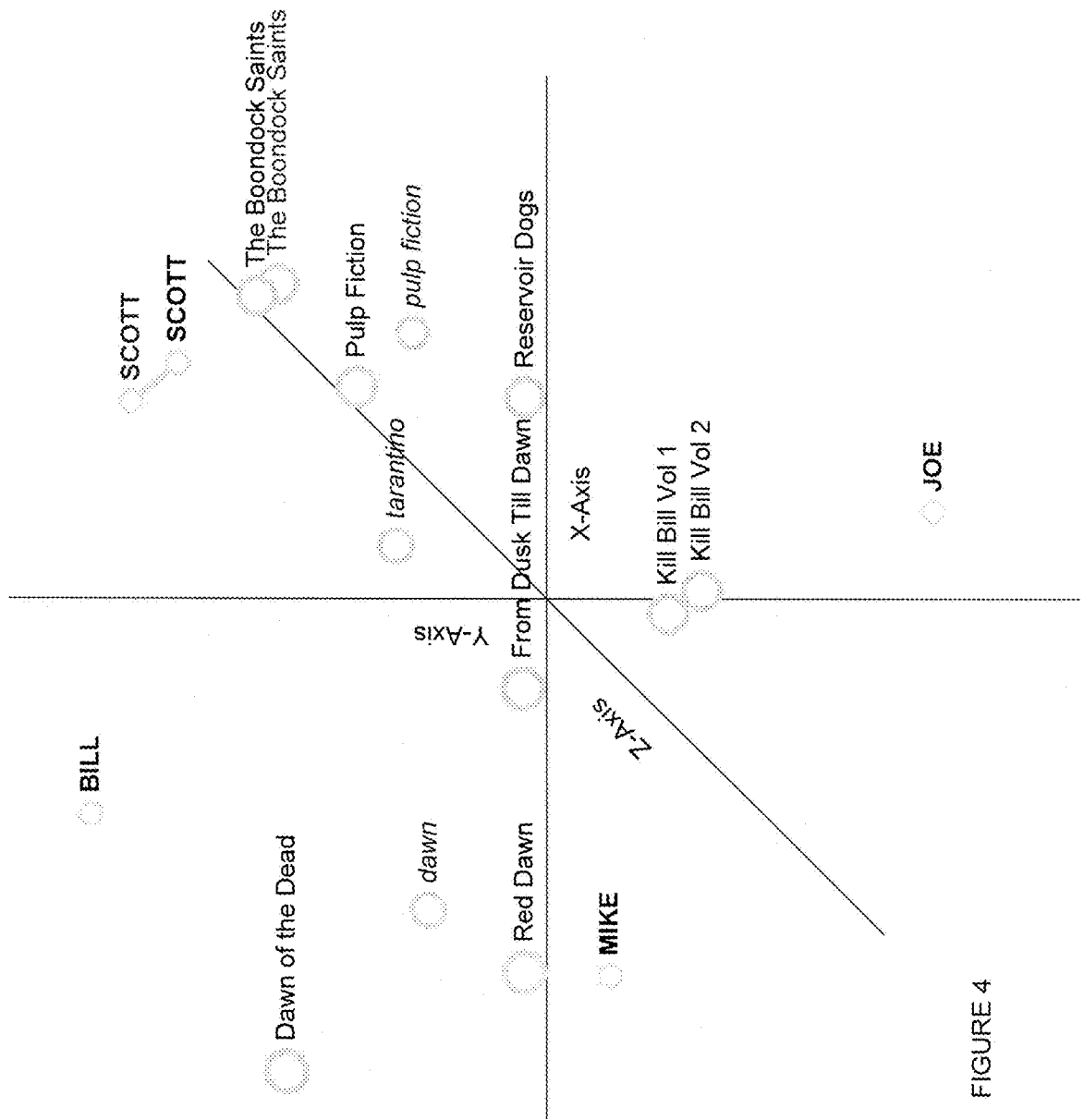
FIG. 4 is another state of the relevancy universe of FIG. 1.

Event 3: In the course of his visit to the website, Scott might be provided with recommendations for films based on his activity. Because he has been actively searching for movies directed by Quentin Tarantino, the entity representing Scott in the relevancy universe is in the general vicinity of several films by Quentin Tarantino. A relevancy-based search using Scott as the criteria would return results such as "Pulp Fiction", "Reservoir Dogs", and "From Dusk Till Dawn" (all incidentally directed by Quentin Tarantino). The film "The Boondock Saints" is also in Scott's general vicinity at this time, and would also be recommended to him because of that fact. This film is in no way related to Quentin Tarantino, but many users who like Quentin Tarantino films also like this film, and those gravitational events have drawn it into the same vicinity in the relevancy universe. Because of its distance, and despite the fact that it is in no way related to Quentin Tarantino, "The Boondock Saints" might even be more strongly recommended to Scott than Quentin Tarantino films. If Scott then purchases "The Boondock Saints", a gravitational event will occur between the two entities. FIG. 4 illustrates the end state of the universe after this event. The end state of the universe then becomes the new initial state of the universe.

Figure 5:
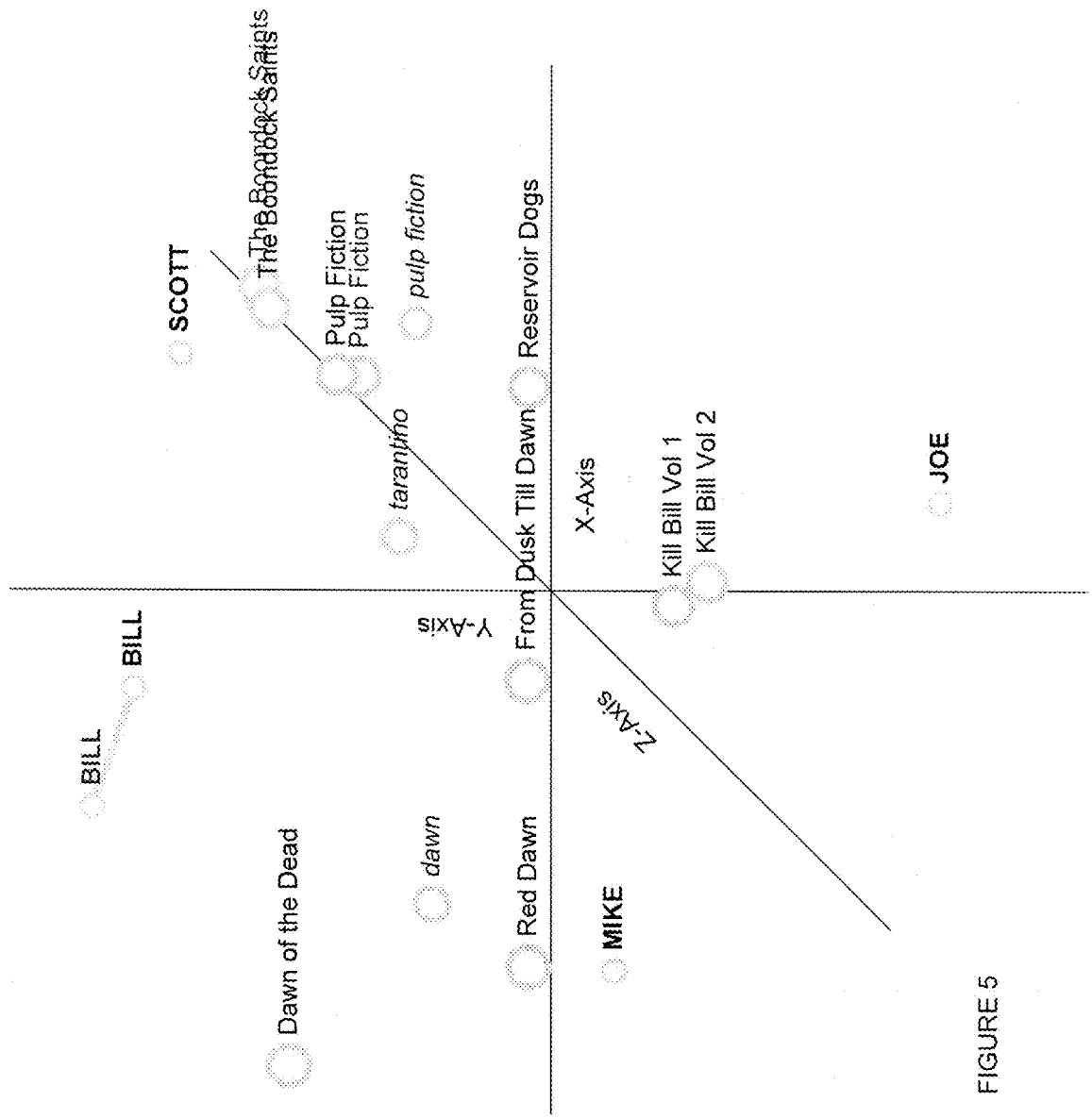
FIG. 5 is another state of the relevancy universe of FIG. 1.

Event 4: Bill is looking for films which are like the film "Pulp Fiction". A relevancy-based search using the film "Pulp Fiction" as the criteria returns results which include "The Boondock Saints", "Reservoir Dogs", and "From Dusk Till Dawn". Despite the fact that "Pulp Fiction", "Reservoir Dogs", and "From Dusk Till Dawn" are all films directed by Quentin Tarantino, the film "The Boondock Saints" is actually more similar to "Pulp Fiction" than other Quentin Tarantino films, and thus Bill selects it of the other search results. As a result, a gravitational event occurs between Bill, the film "Pulp Fiction", and the film "The Boondock Saints". FIG. 5 illustrates the end state of the universe after this event.

Once items are added to the universe, they can be in constant motion in relation to each other, and this constant motion can continually update and refine relevancies between items in the universe. For instance, using the above example, more searches can result in more data points (i.e., entities) being added to the universe over time. As a result of more and more searches conducted, relevancies can increase or decrease in attraction, based on a defined rule set. Interactions between entities can be stored via the recording mechanism and entity attribute updates can be constantly recorded and stored in a database via the storage/retrieval mechanism.

Conventional methods for calculating and determining relevancy between entities involves defining a relationship between each set of two (or more) entities and assigning a "weight" to the relationship. The weight of the relationship acts as a one-dimensional attribute that can be used to determine relevancy between the two entities. The following sequence of events, simplified from the example above, illustrates how relationships between objects and events would have to be defined and maintained using conventional methods. FIG. 6 illustrates the initial state of the relationships.

Event 1: Scott is interested in films directed by Quentin Tarantino, and executes a search with the keyword "tarantino". A simple text search returns results which include "Reservoir Dogs", "From Dusk Till Dawn", "Pulp Fiction", "Kill Bill Vol. 1", "Kill Bill Vol. 2". From the search results, Scott selects "Pulp Fiction". As a result, the weight of the relationship between "tarantino" and "Pulp Fiction" is increased, and a relationship is generated between Scott, the keyword "tarantino", and the film "Pulp Fiction". FIG. 7 illustrates the end state of the relationships after this event. The end state of the relationships then becomes the new initial state of the relationships.

Event 2: Bill is interested in films like "Reservoir Dogs". A relevancy search using "Reservoir Dogs" as search criteria determines that "Reservoir Dogs" is related to "Tarantino", which is subsequently related to the films "Pulp Fiction", "From Dusk Till Dawn", "Kill Bill Vol 1", and "Kill Bill Vol 2". Based on this relationship, those four films will be returned as search results. A further relevancy search determines that "Tarantino" is also related to Scott, and Scott is also related to "Pulp Fiction" with a high weight. Based on this relationship, "Pulp Fiction" will be more strongly recommended to Bill than the other three films. Bill has already seen "Pulp Fiction", so from the search results, he selects "From Dusk Till Dawn". As a result, a relationship will be generated between "Reservoir Dogs" and "From Dusk Till Dawn", as well as between Bill and "From Dusk Till Dawn", and between Bill and "Reservoir Dogs". FIG. 8 illustrates the end state of the relationships after this event.

Thus, besides assigned "weights", there is no further interaction regarding the relevancy between search results in conventional methods. Therefore, if something alters the relationship between the two films, such as the addition of a new, similar films over time, such relevancies are not immediately recognized and therefore would not appear in the any subsequent search results. In some embodiments of the disclosure, the items in the universe are in constant motion in relation to each other and when a new item, such as a new film, is entered into the universe, the application can be assigned an immediate relevance based on standard metadata or other data that can be included when the item is entered into the universe. Over time as new interactions occur, the relevancy between the new film and other films can be updated. In order to duplicate something remotely similar using conventional methods, an individual would have to conduct a new search using the new film specifically as one of the search criteria.

In contrast to conventional methods for calculating and determining relevancy, some embodiments of this disclosure can be self-evolving, in that once an entity is represented in the relevancy universe, its interactions with other objects in the relevancy universe (based on the defined rule sets) can determine its location and vector within the relevancy universe, and therefore its proximity (i.e., relevancy) to other entities within the relevancy universe. Theoretically, a new entity might be placed randomly in the relevancy universe and, by virtue of the defined rule sets, naturally migrate towards particular relevant entities during the course of interactions with other entities. Because of the self-evolving nature of these embodiments, and the fact that events and interactions between actual entities (quantified based on the rule sets) define the location and vector of corresponding entities within the relevancy universe, the relevancy universe can evolve to keep itself "up-to-date". As actual entities cease to interact with each other, their corresponding entities in the relevancy universe can move further from each other, reducing their calculated relevancy to each other. In conventional relevancy engines which are based on weighted relationships, such a change in relevancy would need to involve a change in the weight of one or more relationships.

Because some embodiments of this disclosure define relevancy as the relative distance of one entity from another, finding relevant entities using this method does not involve any sort of complex searching and matching algorithms. Rather, it is simply a matter of calculating distance (albeit in three dimensions) to other entities in the relevancy universe. In other relevancy engines which are based on weighted relationships, finding relevant entities is a matter of finding all relationships that one entity is involved in and comparing weights of those relationships. For small data sets, this is not necessarily difficult or time-consuming, but as the size of the data set grows, this becomes a problem of exponentially increasing magnitude.

Another significant differentiator from other methods for determining relevancy is that some embodiments have the inherent potential to identify relevancy based on very loose or multi-degree relationships. Because these embodiments include an event-based model rather than a relationship-based model, a series of events involving a variety of entities can cause seemingly unrelated entities to come in close proximity when they have no direct, identifiable relationship (e.g., A interacts with B, B interacts with C, C interacts with D, D interacts with E, eventually drawing A and E into proximity, although they have no actual relationship and no direct interactions). In other conventional relevancy engines which are based on weighted relationships, identifying this sort of relationship—if it were even possible—would involve an exponential number of calculations and comparisons. However, in embodiments of this disclosure, it can be a naturally-occurring phenomenon and can be regarded as no different (from the perspective of identifying relevancy) than if there were a direct relationship or interactions between the entities.

Some embodiments of the disclosure provide a search engine application (SEA). The SEA can incorporate a storage/retrieval mechanism consisting of a database defining users, items to be searched for, search terms, etc., as entities within a relevancy universe. When a user searches using one or more search terms, the SEA can determine the most relevant entities specific to the user via a location calculation engine. The most relevant entities can be determined by locating the entities in the relevancy universe which are nearest to the user themselves, the search terms entered by the user, and/or the epicenter of the user and the search terms. In some embodiments, the SEA can be part of a large application (such as a social network) in which interactions between users of the large application are interpreted as events in the relevancy universe. Such events can be based on a defined rule set stored on a computer server in communication with the social network and the events can be calculation via an interaction calculation engine, which can also be stored on the computer server.

For example, a user can be looking for a pizza shop in a particular area. The user can log into a search application, such as a website. The website can access profile data of the user's demographic location to determine the user's local proximity. The website can be connected to a network that is connected to a user-generated database that is populated by member users of the website, allowing such profile data to be obtained. Alternatively, the proximity information can be derived from a geographic determination of the user's IP address. If the search is conducted on a mobile device, GPS data derived from the mobile device can be obtained. In these embodiments, the user's local proximity can become the user's local universe. Therefore, if the search term "Pizza Shop" is entered, the SEA can locate all pizza shops within the user's local universe (e.g., via a location calculation engine connected to the network) and return the results with the closest pizza shop being first. In the case that the user is not in a static location, some embodiments can include a constantly evolving universe of relationships (e.g., via an interaction calculation engine). Thus, the SEA can monitor the user's location using GPS data from the mobile device and constantly update the search results. The website can be similar to or interact with websites on the network that contain directories or data associated with restaurant/business locations (e.g., yellowbook.com).

Some embodiments of the disclosure provide a recommendation application (RA). The RA can incorporate users, items available to be recommended, etc., as entities within a relevancy universe and store them via a storage/retrieval mechanism on a computer server. When a user requests recommendations, entities in close proximity to the user can be returned as recommendations via a location calculation engine. In some embodiments, the RA can be part of a large application (e.g., a purchasing process) in which items to be purchased, each user's purchases, etc. are interpreted as events in the relevancy universe via a define rule set and an interaction calculation engine on the computer server.

An example RA used in some embodiments can be a movie recommendation service. A user can make a personal account within the movie recommendation service and can enter specific demographic and personal preference information into the personal account. For example, the user can enter the following: "Male; from Atlanta, 43 years old, likes gardening, hiking, roller-skating, and the beach". The service can then add the user to a universe and pull objects in the universe closer based on the user's information, as defined by a rule set specific to the service. Therefore, the more information the user adds, the more accurate the universe becomes in relation to the user. The universe can thus be user-generated. In addition, the universe can include additional data from other universes based on input from the user. For example, information can be pulled from a central database connected to another website on a common network in which the user already interacts on (e.g., a social media site like Facebook®).

Based on the user's information, a first snapshot of the user's universe can help create an initial list of recommended movies for the user. Retrieval of information (e.g., information about the user and about movies) can be conducted in real time by the service constantly updating the universe. As the user selects movies to watch, metadata relating to that particular movie can be added to the universe to shift entities in relation to the user and the recommendation list can be updated to become more focused and accurate towards the user's preferences. As new movies become available, they can be added to the universe. The service can scan the new movies and assign them a relevancy for the user, which can either draw them closer to the user or push them farther away from the user in the universe. In addition, feedback from the user can also affect the universe. For example, the user selects a movie that has the following characteristics: southern U.S. setting, roller-skating, beach, terrorist, murder, adultery. This movie was first placed on the user's recommendation list based on the user's initial information (e.g., "Atlanta", "roller-skating", and "beach"). However, the user watches the movie and assigns it a rating of two out of five and enters the following reason: "too much violence, killing, and sex scenes". The service can then move that particular movie farther away from the user in the user's universe as well as other movies that relate to high violence, killing, and sex.

In addition, user's data can be screened and similar users can be placed in similar universes to allow more interactions or separate user universes can be connected to allow interaction between them. In this way, people can receive suggestions based on what other people with similar interests choose.

Some embodiments of the disclosure provide a pure academic relevancy (PAR) application. In these embodiments, any set of entities can be represented in a relevancy universe and relevancy between entities can be calculated, so long as interactions between entities can be applied, recorded, and quantified using rule sets. Thus, relationships between seemingly unrelated data can be found. While some of these relationships could be eventually discovered using other methods, using these embodiments can reduce the time frame in which the discoveries are made, leading to faster recognition of the relationships and possibly more discoveries.

An example PAR application can include a system that analyzes large data sample sets, such as those relating to the environment. Some relationships can be easily discovered like the dumping of raw sewage into a river correlates to the poisoning of fish and the adverse heath of people swimming in that river. Some more subtle relationships, however, can also be discovered on a world-wide basis. For example, the system can include information from worldwide historical databases, creating a large relevancy universe including events of any nature. A user can enter a search term for a specific item and the system can return the results based on relationships of that item in the large universe. By using a large relevancy universe, the system can display relationships between a seemingly small event and a much larger one. For instance, such relationships can uncover that the seemingly small event caused the much larger one (i.e., a "butterfly effect").

Some embodiments of the disclosure include closed database uses, such as financial applications, social media applications, indexing services, health and wellness applications, and real estate applications, as described below.

Some embodiments provide an application for an individual or a corporation to analyze a company's performance against its peers. The application can quickly and efficiently detect and develop trend analyses of industry sectors by incorporating local and worldwide market conditions and financial details about the company. The application can locate similar businesses in the market on a global scale due to the relationship between common relevancies. Buy/sell analysis can also be undertaken based on the performance of similar companies uncovered by the application. A user can first create a universe with information gathered from public sources and store such information on a database in a network. The network can be in communication with, for example, the internet, and the universe can then be updated from publicly available data, such as SEC filings, EDGAR databases, databases of historical financial data from a stock exchange the company is listed with, etc. How entities in the universe interact (e.g., what defines "similar companies") can be determined via a pre-defined rule set in communication with the database on the network.

Some embodiments can be research and analytics applications of stock, bond, and/or mutual fund markets. These applications can aid in the selection of stocks or market items. For example, a universe can be created by a user with market items dispersed among it. The user can enter data based on a particular market item into a database on a network. A defined rule set and an interaction calculation engine can create an initial set of relevancies and assign items a data point in the universe. The application can continuously scan other relevant universes on the network and relevant market items can be continuously drawn into the user's universe. Relevant universes can for example include any database or information source that contains information regarding the products or services being researched. Relevant market items can be any items directly related to or affected by the market item being researched. For example, relevant market items can be determined by similar likely gain/loss patterns, among other characteristics. In some embodiments, if a person is looking to invest in a market item in the field of technology, the application can display a company that produces laptop computers based on the company's market position in the industry, the rise of laptop computer sales and the increase in sales forecasts for laptop computers. The similar market items returned can include those of market competitors and similar industries as well as those of similar short and/or long term financial history, similar short and/or long term financial outlooks, and similar profitability outlooks. For instance, the correlation between the increase in laptop production can lead the application to return suggestions, for example, for an investment in real estate in Taiwan and Chandler, Arizona even though the items are in separate markets. Such a suggestion can come from the fact that both areas are locations of manufacturing for the laptop company. An increase in production of the laptops would require new plants to be built and such actions would result in a rise in the value of real estate in those areas. The suggestions can allow the user to diversify their investment across dissimilar, yet related markets.

Besides financial market data and trend analysis, some embodiments can also incorporate outside influences to determine relevancy. For example, if the market item is a petroleum company, the following information can be analyzed by the application: price of oil (e.g., from the Nymex Crude Future index), current and near-future hurricane and cyclone activity (e.g., from the Tropical Meteorology Project at Colorado State University), current and near-future oil-producing nation social and economic conditions (e.g., from the Food and Agriculture Organization of the United Nations), current and near-future alternative markets and their productivity (e.g., from the ALTEX Global index). In this example, the application can correlate the above relativities in a relevancy universe based on their possible positive or negative interactions on the state of the petroleum company.

Some embodiments of the disclosure provide an application for political parties or any organized group to track trends in the populace. For instance, in the realm of politics, if a candidate is constantly being related to a negative or positive issue, the frequency can add or subtract weight to that issue in a relevancy universe and affect its location in relation to the candidate. The relevancy universe can, for example, be updated by poll results (e.g., from news or media websites or social networking websites). A party or group can use such information to determine where to market more to influence people who are negatively influencing that issue in the relevancy universe using any means at their disposal including news or media websites, social networking websites (e.g., Facebook® or MySpace™), television advertising campaigns running against the targeted demographic, or flyer campaigns and door to door tactics. Any information gained from such activities can be used to update the relevancy universe.

The ability of these embodiments to track multiple diverse data points that seem unrelated can increase the accuracy of any service employing such an application. For example, other embodiments of the disclosure can provide an application for dating services. In a closed database of user-generated information, the application can narrow the field of potential dates by constantly monitoring relevancies between persons. For example, each user can have a profile on a network including information about themselves, where such information is stored in a database. After a meeting between a first and a second user, the first user can enter more information about the second user and vice versa to further define the match process. The information from one or more users can be used to score a "match" between other users with the first user (or the second user). This can allow users to not just rely on self-entered information, but also information from outside sources (i.e., third party data). Therefore, if a user enters that they are a moderate drinker in their profile, but ten other users that have had a social engagement with that user report that they were drinking heavily, the relevance of the user-entered information would be reduced in favor to the third party data. This can increase the probability of proper matches being made. Additionally, the third party data can be added anonymously and also masked from the original user to reduce conflict and friction. The anonymity of the application to not store personal or uniquely identifying information in relation to data points and only create a relativity of one data point with another data point can allow for better security in comparison to conventional services.

Some embodiments of the disclosure provide an application for indexing services (IS). An index such as the Consumer Price Index (CPI) can be managed with the IS application. The CPI is a measure of the average price of consumer goods and services purchased by households and typically lags a month or two in calculation due to the amount of data necessary for the calculation. One aspect of the CPI is the use of "weighting data". Weighting data is the use of estimates of shares of different types of spending expressed as fractions of the total spending within a typical household. In the elementary aggregate level, detail weighting data is not available (for example, the price and amount of women's shoes sold in stores in the southwest), however using the IS application to correlate data from disparate sources, details can be granulated down to the item level by drawing from sources such as barcode scanner data. The initial universe for the application can be created from a resource or database that reflects a CPI specific to any situation. CPIs created with the application can range from, for example, city-wide, state-wide and world-wide.

Another flaw in the CPI is the inability to determine the effect of foreign spending on the economy. The IS application, however, can take information from multiple disparate resources and apply relevancies to the overall CPI. For instance, the IS application, when given proper access to domestic and foreign databases, can, on a real time basis, correlate the exchange of currency in any country into U.S. dollars with data from a passport database regarding the number inbound foreigners and further correlate that data with credit card databases that are converting U.S.-based credit card transactions into a foreign currency, therefore creating a more detailed view of foreign spending in the U.S.

Further, in some embodiments, the IS application can relate where dollars are being spent to create a more accurate forecast for future spending using, for example, data from the Federal Reserve Economic Data (FRED) database, data from the United States Treasury Department indexing current foreign investment in the US, and/or other relevant data on a common network. For instance, if foreign dollars are being spent buying housing by people connected with the solar industry in or near regions that have a high number of solar related companies, the IS application can reveal that correlation and return a result inferring that the solar industry in the U.S. is under a growth phase irrespective of the current state of the solar market or other markets. This revelation can also show that foreign companies are interested in this sector of the U.S. economy, and thus, efforts should be undertaken such as incentive programs to draw even more foreign dollars into the U.S. Using these relations, investors and others can be better prepared as to where to focus their finances for a better return. Again, since the IS application does not use specific data such as individual names and other personally identifiable information, there are no privacy concerns.

Yet another shortcoming of the CPI is that, due to cost purposes, the reweighting of the data is not done on a frequent basis. Therefore, most data is often an estimate based on historical data instead of real-time or near real-time data. As the IS application can be self-evolving in some embodiments, index weighing data can be constantly updated, thus increasing the effectiveness of the CPI.

In addition, the IS application can be applied to historical data to uncover patterns that were previously unobserved using data from databases relating to, for example, the Household Final Consumption Expenditure and the Personal Consumption Expenditures Price Index. For example, six months prior to a recession, there is an increase in sales of fertilizer, garden hoses, the refinancing of primary residences while converting some of the equity to cash in the process, and the increase in the purchase of used fuel efficient cars. All of these items can be correlated to homeowners focusing on their primary residences when their finances are short. The fertilizer and hoses can indicate an increase in growing food in backyards instead of buying from grocery stores. If the interest rates are falling, the refinancing can be an indicator of the homeowners looking to save money by lowering their payments while adding to savings. If the rates are not falling, the indication can be of conducting home improvements instead of purchasing a new residence. The purchase of used fuel efficient cars can be another indicator that people are looking to save money. These relationships can be recognized by the IS application and the overall state between these relationships can be tagged as a predictor for future recessions.

Some embodiments of the disclosure provide an application for credit reporting agencies (CRA). By relating individuals and businesses to their true activities using a CRA application, consumer and business credit can be tracked more accurately. In some embodiments, an application similar to the CRA application can also be extended to debt collection agencies so they can more accurately track and pursue their accounts.

The CRA application can increase the relevancy of data stored by multiple major and minor credit reporting agencies by preparing a master credit record. In some cases, data in one agency's database is missing in another database and the information contained within different agencies' databases are scored and weighed differently. The CRA application can correlate the relevance of data from each agency and provide a unified overall "score". Additionally, the CRA application can assign different types of data more or less relevance based on an individual's interactions to more accurately determine the risk that individual would be to a third party. In some embodiments, the CRA application can include relevant information from systems other than a credit agency database and apply that information to the overall "score". For instance, if an individual's score is being searched by a mortgage company, the more relevant data such as the payment history on the individual's current mortgage or rent can be given a higher significance to other forms of debt. Additionally, the individual's residence and history can be included in the data set to show any patterns of transience.

In some embodiments, the CRA application can create a generic profile in a database to compare individuals for poor credit observation. By analyzing similarities in patterns of individuals that have defaulted on debt or have traditionally poor credit, these similar patterns can be recorded and analyzed to create a generic pattern as a baseline. The CRA application can then predict if an individual would be a good risk based on a comparison of their pattern to the baseline generic pattern. Thus, the CRA application can be an effective risk assessment tool.

In one example, the CRA application can be used to determine the ability of an individual to repay a loan by monitoring the individual in a relevancy universe at multiple points in time over the life of the loan. If the loan type is a home equity line of credit (HELOC), the bank could write into the terms of the loan an individual's future risk to allow for adjustments to such things as interest rate and the amount of available credit the individual has access to. In this example, the CRA application can continually update over the life of the loan to monitor changes to the individual's credit situation and report accordingly. If the individual suddenly begins to open numerous new credit cards and "maxes" them out in the process this could be a strong indication that the individual is nearer to a financial crisis and shifts in the relevancy universe can indicate a bad risk. The bank could then lower the amount of credit on the HELOC accordingly to reduce the bank's risk of default.

The following example illustrates how the CRA application according to some embodiments of the disclosure can be more effective over current systems. An individual has an exceptional credit rating with no history of a missed payment or a default on any debt. Unfortunately, a major event occurs for the individual, creating a credit crisis. The crisis lasts for fifteen months after which time their payment history resumes to their previous well-kept standards. Current systems do not take into account the unique nature of that event and often would assign even greater weight to that single event rather than the rest of the individual's exceptional history. The CRA application can correlate the individual's history with both the relevant pre-event and post-event data so that the anomaly is given less weight in the relevancy universe, therefore allowing the individual to receive a more appropriate score.

The following is another example that illustrates how the CRA application according to some embodiments of the disclosure can be more effective over current systems. An individual worked for a company and that company, through no fault of the individual, collapsed financially. As a result, the individual was forced to sell off some investment property in order to stay safe financially during the individual's transition to a new job. The property was listed for sale and several parties were interested. While the property was in the process of being sold, a forest fire burned through the area damaging the property and devastating the surrounding area. As a result, the individual could no longer sell the property for anything close to the true value and could no longer afford to make the payments on the property. Therefore, the individual was forced to allow foreclosure of the property. The individual spent the next fifteen months finding a new job and rebuilding finances. Following the rebuilding period, the individual never missed a payment and was current on all their bills. With current systems of credit reporting, the fifteen-month period reflects badly on the individual's credit report for a period of five to seven years before its weight (i.e., relevance) is diminished. The CRA application can more accurately reflect the true nature of the credit situation by taking the anomalous event into account when weighing the relevancy of all factors. This can allow an inquisitor a more realistic view of the individual's situation and financial stability.

Some embodiments of the disclosure provide an application for health and/or disease analysis. For example, the application can be applied to epidemic or pandemic-type diseases by monitoring world health statistics to track known symptoms and/or conditions of the disease. The application can access databases from the World Health Organization, the Center for Disease Control, as well as access online news services and discussion forums to combine the information into a master universe. Currently, conventional analysis methods for determining epidemics can take weeks due the overwhelming task of sorting through a vast quantity of data possibly pertaining to the disease. Virtual real time tracking of data by the application can allow discoveries far quicker than relying on the human intervention currently needed to determine an outbreak. As well, in the event of an epidemic, faster discoveries can permit faster alerts to the public, thus allowing more preventative care rather than disease management and saving more lives. The application can monitor known markers for a certain disease on a global scale and, in near real-time, evaluate data based on the relationships between the events necessary for an outbreak in a respective relevancy universe. As the relevancies of the monitored events in the universe increase, an alert status can also increase. In addition, the application can uncover new triggers by determining items in close proximity to the manually-entered triggers in the relevancy universe during an outbreak.

When applied to historical data, some embodiments of the disclosure can evaluate seemingly casual relationships between worldwide outbreaks and uncover similarities between the outbreaks to help find a potential cause of the outbreak and/or a cure. Throughout history, many scientific breakthroughs and discoveries have been made almost accidentally by teams of researchers poring over documents and data. One specific historical example is the discovery of clusters of Multiple Sclerosis (MS) outbreaks worldwide. One such outbreak involved the Faroe Islands starting in 1943 when 25 cases of the disease were diagnosed. Considering that there had never been a case of MS diagnosed in the Islands, it still took nearly 20 years until in a researcher correlated the outbreaks. A further ten years of more detailed analysis revealed more potential triggers of the outbreak. The detailed analysis finally revealed that the only major event that occurred during that period was the occupation of the island by British troops during the Second World War. The detailed analysis also revealed that many of the troops came from the Scottish highlands, an area that had one of the highest rates of MS in the world, and that the outbreak had three distinct categories of people who were affected. Creating a large database that includes the same data used in the previous analyses, among other data, the application can create a relevancy universe and immediately determine the discovered relationships based on high degrees of relevancies between the time frame, the troop occupation, and the types of people affected.

In some embodiments, a similar health application can be used by medical insurance companies to track and forecast disease by age, gender, type, and/or location and then correlate this data with other conditions.

Some embodiments of this disclosure can be applied to a Multiple Listing Service to provide a more accurate method of rating neighborhoods. The application can correlate information about the neighborhood such as crime data from the National Crime Information Center, business information from databases of local and national Chambers of Commerce, and demographics from the United States Census Bureau, and create long term trend analyses to allow builders to better understand what type of houses to construct and what type of retail or other businesses might be suitable for such a neighborhood.

From a consumer standpoint, the application can more accurately deliver home buying suggestions by improving the correlation of information pertaining to surrounding properties. Instead of a consumer relying on a conventional listing service to retrieve static pages of property details, the application can provide only those listings that are the most relevant to the consumer. The consumer can enter standard criteria that they are looking for in property, such as a general or specific location, number of bedrooms, number of bathrooms, etc., as well as other seemingly non-relevant information such as, but not limited to, age of children, work location/job field, social and athletic interests, etc. The standard criteria can determine general areas and/or properties, while the non-standard criteria can further determine which of those general areas or properties best fits the consumer.

For example, the non-standard criteria can affect the search results in that age of children can correlate information (e.g., from the National Center for Education Statistics database) regarding schools in the general areas, such as highly regarded schools that are in close proximity to a property that matches the standard criteria. Also, work location can relate to areas within close range to the consumer's work location. However, if the consumer is not employed, information relating to the consumers work experience and skills by entering the individual's resume and work history data into a database can be correlated to job listings contained in such sources as Monster.com and jobing.com databases to find a property close to where the consumer may be able to find a suitable job. In addition, social and athletic data (e.g., from a local Chamber of Commerce) can narrow the property search to general areas that encompass the consumer's interests, such as locations in close proximity to theaters, parks and sports venues.

Some embodiments of the disclosure can provide a store application used by grocery or retail stores. For example, the store application can use inventory data to correlate the consumption of items based on any number of factors, such as specific location, time of day, week, month, or year. For non-perishable items, the store application can analyze usage trends or seasonal events for certain products, providing how many inventory items are needed daily, weekly, monthly or yearly. The application can also adapt to the changes in the trends to fend off shortages. For perishable items on a city level distribution chain, the store application can instantly track developing usage during a day to create a better load plan for delivery trucks and insure that the produce or other perishables are only delivered on an as-needed basis. Thus, the store application can increase the efficiency in the distribution of products.

In some embodiments, the store application can aid in new product releases by taking relative data (e.g., from commercial sources such as First Data or from the store's purchasing database) and determining where a new product should be introduced to achieve greater success. Such relative data can include information regarding which areas of a city, county, state or country were more successful when releasing similar types of products. By correlating the success and the sales rate of similar products, the store application can predict where the new product will be successful.

In some embodiments, the store application can provide real-time information and statistics, therefore allowing constant updates of purchasing relationships. For example, specific locations inside of a store in which particular items sell best can also be identified. This can aid in plans for restructuring stores or laying out future facilities.

From an advertising perspective, the store application can also help advertising agencies and/or product manufacturers in determining where to allocate finances for the highest rate of return for a specific product. Using the store application for this purpose can reduce the amount of wasted advertising spent in locations where there is no demand. Again, as the store application can be self-evolving, it can more quickly identify early demand in new markets for particular items.

Some embodiments of the disclosure provide a travel industry (TI) application used by travel industries to correlate travel trends. The TI application can use relevancies of customers to determine a suitable trip and therefore can make suggestions or target advertising directly to specific customers. Certain demographic data for a customer can be used to set up an initial state of a relevancy universe. As the customer proceeds through various search paths, the customer's actions can change the state of the relevancy universe. Following these actions, future search results can more accurately reflect items that would be of interest to the customer.

For instance, the TI application can be a travel website that encompasses a massive database of data related to hotels, cars, locations, etc. A user can sign up for service by the travel web site and enter basic demographic data. For example, the user enters a time frame for traveling and the following demographic information: "male, 35, married, software engineer, $80,000 annual income, likes the beach, sailing and shopping, has an Irish setter and has a fish tank". The user then decides to search for a vacation in a specific region such as the Caribbean. The website then displays results returned for the search, revealing results based on proximity to a beach and shopping area. The website also correlates the user's income data to include proper price ranges in the most relevant results. Based on the user's occupation, the website also returns locations that have free internet in case the user needs to check email or is working on a project while on vacation. In addition, it seems that there is an odd but strong relevance between people who own Irish setters and poker players. Therefore, the top result displayed by the website is a resort that is moderately priced, close to a beach and shopping, has free wireless internet, and is close to a casino hosting a poker tournament during the user's travel time frame. Although poker was not mentioned in the demographic data, the website returned results including additional amenities that were of possible interest to the user.

Some embodiments of the disclosure provide a national security/crime (NSC) application. The NSC application can observe links between people to track criminals or terrorist cells. For instance, terrorist cells are typically headed by a single individual in contact, by one form or another, with all members of the cell. However, many members are never in contact with other members and unaware of the other members' involvement with the cell. By correlating relevancies between members to find potential leaders, the application can create a more narrow field of suspects that would require close monitoring. The NSC application can also link previously unrelated habits, such as purchasing, living, etc., to develop patterns to recognize future suspects before they are known by analyzing the pattern of the known criminal and looking at the people in the universe closest to that individuals patterns and habits.

For example, an investigating agency can enter information such as the name of a suspect, a location they have been confirmed to live at and known associates of the suspect. The application can then create a relevancy universe for that suspect including this information. The relevancy universe can be continuously updated with new relevant addresses, other known associates, interests and habits of the specific suspect entered by various agencies. In addition, in this example, credit detail can be added to the suspect's relevancy universe to see spending habits and possibly establish a pattern of suspicious activity. Common patterns or other related information can cause related suspects to merge closer together in the relevancy universe, allowing the NSC application to relate known associates to others to get a more complete picture of possible groups.

In one embodiment, the NSC application can be used to relate situations such as the course of events surrounding Sep. 11, 2001 ("9/11"). The analysis of the events following 9/11 revealed previously unknown relationships between nineteen of the men involved. Uncovering the tracks of these men revealed massive intelligence failures due mostly to the disparate nature of intelligence gathering agencies throughout the world with separate, private databases. After the attacks, the information from all these disparate sources revealed that the nineteen men, prior to the 9/11 events, were being tracked by one or more of the following: the U.S. CIA and FBI and intelligence agencies in Great Britain, Israel, Spain and Germany. Collectively, these agencies had the information to identify the nineteen men based on their interactions, but no single service had the capacity or the ability to analyze all of the information and determine relationships. One reason for this is that, for privacy and security reasons, none of the agencies allow unfettered access to all of the data at a single point in time.

One advantage of the NSC application is that it can retrieve data and anonymize the source, thus protecting the intelligence agencies' agents and informants. The application may only need to validate the data when it first is entered into the universe to establish its initial relevancy. Once entered, any relevant identifying information that is not critical to the overall result can be removed or hidden. Such a method can allow the sharing of data across agencies without having to know which agency or who within that agency supplied the information, thus protecting trusted and confidential sources. Therefore, data from multiple agencies can be loaded into the universe and relationships between items, people and/or events can be established with no need to have knowledge of where the information came from. The relationships can become more relevant as they are confirmed by more sources, thus increasing the probability of better intelligence even if some information is false.

In taking the 9/11 example: Mohammad Atta (one of the primary hijackers and planners) was under surveillance by the BND (German intelligence) since 1998; Spanish intelligence service linked Atta to Imad Eddin Barakat Yarbas who was on a watch list and had his phones tapped since 1997; before and after the 9/11 events, Yarbas was tied to other arrested suspects with connections to Salafist Group for Call and Combat (GSPC); the GSPC was on the watch list of the British and Italian intelligence agencies; one member of the GSPC, Abu Doha, was on the CIA watch list for recruiting members to blow up the G8 Summit in Genoa in 2008, the CIA connected Abu Doha to Ahmed Rassam who was convicted of trying to bomb Los Angeles International Airport in 2000; and Saaed Alghamdi was convicted of plotting to fly an airliner into the CIA headquarters.

None of these relationships were uncovered until after the 9/11 events since they all involved separate intelligence service databases. If the application were given the above subset of data surrounding the suspects, perhaps with airline ticket purchasing data, it could uncover this network of terrorists by analyzing individuals and events within close proximity of each other in the relevancy universe and then providing the relationships found. With the initial knowledge of possible connections between these terrorists, other information relating to them could have been analyzed and seemingly unrelated patterns could have also been observed by the NSC application, possibly predicting certain portions of the 9/11 events.

It will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the disclosure are set forth in the following claims.

The invention claimed is:

1. An apparatus for searching among a plurality of entities on a computer network by a user, the apparatus comprising:
   a computer server in communication with the computer network, the computer server including:
      a database with a storage mechanism that stores the plurality of entities and attributes specific to each of the plurality of entities, the attributes including a location value, vector, mass factor, and time of each of the plurality of entities in a relevancy universe,
      a rule set that defines how interactions between the plurality of entities in the relevancy universe are quantified using an algorithm modeling at least some physical interactions and the plurality of entities' attributes, and
      an interaction calculation engine that uses the rule set to interpret and apply interactions between at least a first portion of the plurality of entities, the interactions causing a transformation of at least the first portion of the plurality of entities' attributes, including a change in the mass factor of at least one entity of the first portion of the plurality of entities;
   a location value calculation engine in communication with the computer network;
   the user searching for a first entity using the location value calculation engine;
   the location value calculation engine using the computer server to locate the first entity in the storage mechanism and determine at least a second portion of the plurality of entities relevant to the first entity based on the first entity's current attributes and the plurality of entities' current attributes; a display for and
   displaying at least the second portion of the plurality of entities to the user on the computer network.

2. The apparatus of claim 1, wherein at least one of the interaction calculation and the location value calculation is implemented on a special-purpose computer.

3. The apparatus of claim 1, wherein at least one of the database and the rule set is implemented on non-transitory computer readable media.

4. The apparatus of claim 1, wherein the database further includes a recording mechanism that stores the interactions.

5. The apparatus of claim 1 wherein the attributes further include a unique identifier for each of the plurality of entities in the relevancy universe.

6. The apparatus of claim 5 wherein the recording mechanism further comprises an input mechanism, another storage mechanism, and a relay mechanism.

7. The apparatus of claim 1 wherein the relevancy universe is a theoretical three-dimensional space.

8. The apparatus of claim 7 wherein the interactions between at least the first portion of the plurality of entities can be a simulated gravitational event in the theoretical three-dimensional space.

9. The apparatus of claim 1 wherein the relevancy universe is represented using three-dimensional Cartesian coordinates.

10. The apparatus of claim 7 wherein the relevancy universe further comprises a friction factor that can affect the attributes when no interactions are applied to at least a third portion of the plurality of entities.

11. The apparatus of claim 7 wherein the relevancy universe further comprises an entropy factor that can affect the attributes when no interactions are applied to at least a third portion of the plurality of entities.

12. A system used to search among a plurality of entities on a computer network by a user, the system comprising:
   a computer server in communication with the computer network, the computer server including
      a database with a storage mechanism that stores the plurality of entities and current simulated physical attributes specific to each of the plurality of entities in a relevancy universe, the simulated physical attributes including a location value, a vector, a mass factor, and a time of each of the plurality of entities in the relevancy universe,
      a rule set that defines how interactions between the plurality of entities in the relevancy universe are quantified using an algorithm modeling at least some physical interactions and the plurality of entities' simulated physical attributes, and
      an interaction calculation engine that uses the rule set to interpret and apply interactions between at least a first portion of the plurality of entities, the interactions transforming at least the first portion of the plurality of entities' simulated physical attributes, including a change in the mass factor of at least one entity of the first portion of the plurality of entities; and
   a location value calculation engine in communication with the computer network that locates a first entity searched by the user and determines and displays at least a second portion of the plurality of entities relevant to the first entity based on the first entity's current simulated physical attributes and the plurality of entities' current simulated physical attributes.

13. The system of claim 12 wherein the server further comprises a recording mechanism that stores the interactions between at least the first portion of the plurality of entities.

14. The system of claim 12, wherein at least one of the interaction calculation and the location value calculation is implemented on a special-purpose computer.

15. The system of claim 12, wherein at least one of the database and the rule set is implemented on non-transitory computer readable media.

16. A method for finding relationships between physical objects represented on a computer network, the method comprising:
> gathering data about the physical objects from the computer network;
> representing the physical objects as entities in a relevancy universe;
> assigning simulated physical attributes to the entities based on the data gathered from the network, the simulated physical attributes including a location value, a vector, a mass factor, and a time of each of the entities in the relevancy universe;
> creating interactions between the entities, the interactions constantly modifying the simulated physical attributes of the entities, including the mass factor, based on an algorithm modeling at least some physical interactions and further data about the physical objects gathered on the computer network;
> recognizing relationships between entities in close proximity to each other in the relevancy universe; and
> associating the relationships between entities as relationships between the physical objects; and locating, in response to a search request, an entity searched by a user, and determining at least a portion of the plurality of entities relevant to the first entity based on the first entitiy's current simulated physical attributes and the plurality of entities' current simulated physical attributes.

17. The method of claim 1, wherein the interaction calculation engine further ensures the combined mass factor of all entities of the plurality of entities remains constant.

18. The system of claim 12, wherein the interaction calculation engine further ensures the combined mass factor of all entities of the plurality of entities remains constant.

19. The method of claim 16, further comprising ensuring the combined mass factor of all entities remains constant.

20. The system of claim 1, wherein input of the user determines, at least in part, the location value of at least one entity of the plurality of entities.

* * * * *